(12) United States Patent
Amin et al.

(10) Patent No.: US 8,187,987 B2
(45) Date of Patent: May 29, 2012

(54) DURABLE GLASS HOUSINGS/ENCLOSURES FOR ELECTRONIC DEVICES

(75) Inventors: Jaymin Amin, Corning, NY (US); Matthew John Dejneka, Corning, NY (US); Linda Ruth Pinckney, Corning, NY (US); Katherine Rose Rossington, Corning, NY (US); Robert Sabia, Corning, NY (US)

(73) Assignee: Corning Incorporated, Corning, NY (US)

( * ) Notice: Subject to any disclaimer, the term of this patent is extended or adjusted under 35 U.S.C. 154(b) by 127 days.

(21) Appl. No.: 12/545,475

(22) Filed: Aug. 21, 2009

(65) Prior Publication Data

US 2010/0047521 A1    Feb. 25, 2010

Related U.S. Application Data

(60) Provisional application No. 61/090,719, filed on Aug. 21, 2008.

(51) Int. Cl.
   *C03C 3/085* (2006.01)
   *C03C 3/091* (2006.01)
   *C03C 3/087* (2006.01)
   *C03C 3/078* (2006.01)
   *C03C 15/00* (2006.01)

(52) U.S. Cl. ............... 501/69; 501/66; 501/70; 501/72; 65/30.14

(58) Field of Classification Search ............ 501/65, 501/66, 67, 68, 69, 70; 65/30.13, 30.14, 65/69, 95, 104, 114
See application file for complete search history.

(56) References Cited

U.S. PATENT DOCUMENTS

| | | | |
|---|---|---|---|
| 3,524,737 A | 8/1970 | Doyle et al. | |
| 5,277,946 A * | 1/1994 | Nagai et al. | 428/426 |
| 5,895,768 A * | 4/1999 | Speit | 428/846.9 |
| 7,323,276 B2 * | 1/2008 | Ohtaguro et al. | 430/5 |
| 7,666,511 B2 * | 2/2010 | Ellison et al. | 428/426 |
| 2004/0248017 A1* | 12/2004 | Ohtaguro et al. | 430/5 |
| 2005/0090377 A1 | 4/2005 | Shelestak et al. | |
| 2008/0292856 A1 | 11/2008 | Garner et al. | |
| 2009/0197048 A1 | 8/2009 | Amin et al. | |
| 2009/0202808 A1 | 8/2009 | Glaesemann et al. | |

FOREIGN PATENT DOCUMENTS

| | | |
|---|---|---|
| DE | 19616633 C1 | 5/1997 |
| GB | 2335423 A | 9/1999 |
| WO | 2008143999 A1 | 11/2008 |
| WO | 2009108339 A2 | 9/2009 |

* cited by examiner

*Primary Examiner* — Jerry Lorengo
*Assistant Examiner* — Noah Wiese
(74) *Attorney, Agent, or Firm* — Timothy M Schaeberle; Dean Y Shahriari

(57) ABSTRACT

The invention relates to glass articles suitable for use as electronic device housing/enclosure or protective cover which comprise a glass material. Particularly, a housing/enclosure/cover comprising an ion-exchanged glass exhibiting the following attributes (1) radio, and microwave frequency transparency, as defined by a loss tangent of less than 0.03 and at a frequency range of between 15 MHz to 3.0 GHz; (2) infrared transparency; (3) a fracture toughness of greater than 0.6 MPa·m$^{1/2}$; (4) a 4-point bend strength of greater than 350 MPa; (5) a Vickers hardness of at least 450 kgf/mm$^2$ and a Vickers median/radial crack initiation threshold of at least 5 kgf, (6) a Young's Modulus ranging between about 50 to 100 GPa; (7) a thermal conductivity of less than 2.0 W/m° C., and (9) and at least one of the following attributes: (i) a compressive surface layer having a depth of layer (DOL) greater and a compressive stress greater than 400 MPa, or, (ii) a central tension of more than 20 MPa.

14 Claims, No Drawings

DURABLE GLASS HOUSINGS/ENCLOSURES FOR ELECTRONIC DEVICES

CROSS-REFERENCE TO RELATED APPLICATIONS

This application claims the benefit of priority under 35 U.S.C. §119(e) of U.S. Provisional Application Ser. No. 61/090,719 filed on Aug. 21, 2008.

TECHNICAL FIELD

The invention is directed to glass materials that can be used as durable housings or enclosures for electronic devices. In particular, the invention is directed to an ion-exchanged glass article having high strength, low thermal conductivity, and near-IR, radio and microwave frequency-transparency which is suitable for use as durable housings or enclosures for electronic devices.

BACKGROUND

In the past decade portable electronic devices such as laptops, PDAs, media players, cellular phones, etc. (frequently referred to as "portable computing devices"), have become small, light and powerful. One factor contributing to the development and availability of these small devices is the manufacturer's ability to reduce of the device's electronic components to ever smaller and smaller sizes while simultaneously increasing both the power and or operating speed of such components. However, the trend to devices that are smaller, lighter and more powerful presents a continuing challenge regarding design of some components of the portable computing devices.

One particular challenge is associated with the design of the portable computing devices is the enclosure used to house the various internal components of the device. This design challenge generally arises from two conflicting design goals—the desirability of making the enclosure lighter and thinner, and the desirability of making the enclosure stronger and more rigid. The lighter enclosures, which typically use thin plastic structures and few fasteners, tend to be more flexible, are prone to scratching, and have a greater tendency to buckle and bow as opposed to stronger and more rigid enclosures which typically use thicker plastic structures and more fasteners which are thicker and have more weight. Unfortunately, the increased weight of the stronger, more rigid structures may lead to user dissatisfaction, and bowing/ buckling of the lighter structures may damage the internal parts of the portable computing devices.

In view of the foregoing problems with existing enclosures or housings, there is a need for improved enclosures or housings for portable computing devices. In particular, there is a need for enclosures that are more cost effective, smaller, lighter, stronger and aesthetically more pleasing than current enclosure designs.

SUMMARY

In one embodiment the invention relates to portable electronic devices capable of wireless communications. The portable electronic devices include an enclosure/housing or protective cover that surrounds and/or protects the internal operational components of the electronic device. The enclosure/housing/cover is comprised of a glass material that permits wireless communications therethrough. The wireless communications may for example correspond to Infrared (IR), RF, and microwave communications, and further the glass material may be IR, microwave and radio-transparent thereby allowing wireless communications therethrough.

The invention further relates to an article suitable for housing, enclosing or covering the components of a portable electronic device, the article comprising an ion exchanged glass exhibiting a compressive layer having a depth of layer (DOL) greater than or equal to 20 µm. The glass material further exhibits certain properties which render it particularly suitable for use as an electronic device housing/enclosure/cover. In particular, those properties which make this glass suitable for use a housing/enclosure/cover include: (1) radio, and microwave frequency transparency, as defined by a loss tangent of less than 0.03 and at a frequency range of between 15 MHz to 3.0 GHz; (2) infrared transparency; (3) a fracture toughness of greater than 0.6 MPa·m$^{1/2}$; (4) a 4-point bend strength of greater than 350 MPa; (5) a Vickers hardness of at least 450 kgf/mm$^2$ and a Vickers median/radial crack initiation threshold of at least 5 kgf; (6) a Young's Modulus ranging between about 50 to 100 GPa; (7) a thermal conductivity of less than 2.0 W/m° C., and (8) and at least one of the following attributes: (i) a compressive surface layer having a depth of layer (DOL) greater and a compressive stress greater than 400 MPa, or, (ii) a central tension of more than 20 MPa.

In certain embodiments the thickness of glass article housing/enclosure or cover is less than 2 mm and exhibits an aspect ratio greater than 25 to 1 (i.e., maximum dimension of length, width, or diameter which is >25 times greater than the thickness).

The ion exchanged glass article can be used in a variety of consumer electronic articles, for example, cellphones and other electronic devices capable of wireless communication, music players, notebook computers, PDA's, game controllers, computer "mice", electronic book readers and other devices.

DETAILED DESCRIPTION

As is described herein below, the needs of the industry for more cost effective, smaller, lighter, stronger and aesthetically more pleasing housings, enclosure or protective covers are met by the use of durable glass articles as the outer shell or enclosure/housing/cover for consumer electronics, for example, cell phones, music players, notebook computers, game controllers, computer "mice", electronic book readers and other devices. These glass materials possess certain advantages such as weight and/or resistance to impact damage (e.g., denting) and scratching over the present materials such as plastic and metal. Furthermore, the glass materials described herein are not only durable, but, unlike many of the materials presently used for housings/enclosures/covers, in particular metallic housing/enclosures, the use of glass materials does not interfere with wireless communications.

As used herein the terms "enclosure" and "housing" and "cover or protective cover" are used interchangeably. Also as used herein, the phrase "the compositions according to the invention consist essentially of, in mole percent as oxides on a batched basis" means that impurities such as iron, nickel, cobalt, and other elements can be present in the materials used to prepare the glass and are not to be included or understood as being deliberately added to form the glass composition unless desired for color.

The glass material which is suitable for use in housing/ enclosing or protecting/covering the components of a portable electronic device is preferably comprised of an alkali aluminosilicate glass, due to the fact that these type of glasses generally possess sufficient chemical and mechanical durability, for this housing/enclosure/cover application, particularly when compared to plastic and other non-alkali glass based housings/enclosures/cover; hereinafter the term enclosure is intended to cover housing, enclosures or protective covers.

The material selected generally depends on many factors including but not limited to radio and microwave frequency transparency, 4-point bend strength, stiffness/Young's Modulus, hardness, crack indentation threshold, thermal conductivity, depth of compressive layer (DOL), surface compressive stress and central tension. Formability, finishing, design flexibility, and manufacturing costs associated with this glass material also factor into whether the particular glass material is suitable for use as the electronic device enclosure. Furthermore, the material selected may also depend on aesthetics including color, surface finish, weight, etc.

In one particular embodiment, the invention comprises an article suitable for use as an electronic device enclosure comprising an ion exchanged glass material exhibiting both radio and microwave frequency transparency, as defined by a loss tangent of less than 0.03 and at a frequency range of between 15 MHz to 3.0 GHz, infrared transparency, a fracture toughness of greater than 0.6 MPa·m$^{1/2}$, a 4-point bend strength of greater than 350 MPa, a Vickers hardness of at least 600 kgf/mm$^2$ and a Vickers median/radial crack initiation threshold of at least 5 kgf, a Young's Modulus ranging between about 50 to 100 GPa, a thermal conductivity of less than 2.0 W/m° C.

Additionally, the glass article enclosure should exhibit at least one of the following attributes: (i) a compressive surface layer having a depth of layer (DOL) greater than 20 μm and a compressive stress greater than 400 MPa, or, (ii) a central tension of more than 20 MPa.

The glass material/enclosure is comprised of a glass material that exhibits at least one ion exchanged surface formed using any ion exchange process known to those in the art is suitable as long as the above DOL and compressive stress are achieved.

In an another exemplary embodiment the housing or enclosure exhibits an overall thickness of 2 mm and compressive layer exhibiting a DOL of 40 μm with that compressive layer exhibiting a compressive stress of at least 525 MPa. Again, any ion exchange process which achieves these features is suitable.

In particular, the central tension CT within a glass article can be calculated from the compressive stress CS. Compressive stress CS is measured near the surface (i.e., within 100 μm), giving a maximum CS value and a measured depth of the compressive stress layer (also referred to herein as "depth of layer" or "DOL"). The relationship between CS and CT is given by the expression:

$$CT=(CS \cdot DOL)/(t-2\ DOL) \quad (1),$$

wherein t is the thickness of the glass article. Unless otherwise specified, central tension CT and compressive stress CS are expressed herein in megaPascals (MPa), whereas thickness t and depth of layer DOL are expressed in millimeters.

This requisite fracture toughness in excess of 0.6 MPa·m$^{1/2}$, in combination with 20 μm/surface compressive stress exceeding 400 MPa combination (or CT exceeding 20 MPa), the Vickers hardness/indentation threshold requirements, and the 4-point bend strength of greater than 350 MPa, all function to result in an enclosure which is sufficiently strong and durable so as to withstand typical consumer use/applications. One measure of this durability feature which the aforementioned ion-exchanged glass article is capable of meeting is the ability of the ion exchanged glass article to withstand a standard drop testing requirement involving numerous (e.g., 5) impacts/drops from a height of one meter onto a hard surface such as concrete or granite.

In another exemplary embodiment the article, particularly the electronic device enclosure exhibits radio and microwave frequency transparency, as defined by a loss tangent of less than 0.015 over the frequency range of between 500 MHz to 3.0 GHz. This radio and microwave frequency transparency feature is especially important for wireless hand held devices that include antennas internal to the enclosure. This radio and microwave transparency allows the wireless signals to pass through the enclosure/housing enclosure and in some cases enhances these transmissions. Furthermore, it may also be desirable to be transparent in the infrared to allow wireless optical communication between electronic devices; specifically an infra-red transparency of greater then 80% at wavelengths ranging from 750 to 2000 nm. For example IR communication can be used to download music files to a portable music player, or workout data can be uploaded from a GPS or heart rate monitor to a computer for analysis.

The glass enclosure described herein comprises a strengthened glass that deforms upon indentation primarily by densification rather than by shear faulting. The glass is free of subsurface faulting and radial cracks upon deformation and is consequently more resistant to damage than typical ion-exchangeable glasses and, when strengthened by ion exchange, is more resistant to crack initiation by shear faulting. In one embodiment, the glass enclosure comprises an ion exchanged glass and has a Vickers median/radial crack initiation threshold of at least 5 kilogram force (kgf). In a second embodiment, the glass enclosure has a Vickers median/radial crack initiation threshold of at least about 10 kgf and, in a third embodiment, the glass enclosure has a Vickers median/radial crack initiation threshold of at least about 30 kgf.

In a still further embodiment the electronic device housing or enclosure comprises a glass which exhibits a fracture toughness of greater than 0.70 MPa·m$^{1/2}$, and an 4-point bend strength of greater than 475 MPa, preferably greater than 525 MPa and a Young's Modulus/elasticity ranging between 50 and 75 GPa.

Thermal conductivities at the aforementioned levels of particularly of less than 2 W/m° C., are likely to result in a housing/thermal enclosure that remains cool to the touch even in high temperatures approaching as high as 100° C. Preferably, the glass housing exhibits a thermal conductivity of less than 1.5 W/m° C. For comparison, it should be noted that a ceramic such as alumina may exhibit thermal conductivities as high as 29 W/m° C.

In certain embodiments the glass article exhibits a transparent surface which is defined as a having at least one surface exhibiting a Ra roughness of less than 50 nm, preferably less than 15 nm. In order to achieve this level of surface roughness, one option is to polish the surface using standard polishing techniques so as to achieve the requisite surface roughness of less than 50 nm, preferably less than 15 nm. Alternatively, the glass article can formed using a mold having a polished or non-textured surface so as to achieve the requisite surface roughness of less than 50 nm, preferably less than 15 nm.

In certain other embodiments the glass article may appear opaque, meaning that the article possesses at least one surface exhibiting a Ra roughness between 50 nm to 15 μm. The advantage of this opaque article feature is that the glass housing/enclosure article exhibits desirable anti-smudge or fingerprint resistant properties. In order to achieve this level of surface roughness, resulting in the article appearing to be opaque, the glass article can be mechanically abraded (using standard abrasion techniques) and thereafter subject to an etching step which results in the removal of any subsurface damage which may have been created by the abrasion step. This combination of abrasion/etching steps can be performed either during or after the actual article formation. Alternatively, the glass article can formed using a mold having a textured surface so as to achieve the requisite surface roughness of between 50 nm and 15 µm.

As mentioned hereinabove, the glass materials suitable for use as electronic device housing or enclosures comprise an alkali aluminosilicate glass material due to their sufficient chemical durability and mechanical properties, for this housing/enclosure application, particularly when compared to plastic and other non-alkali glass based housings/enclosures.

A representative broad alkali aluminosilicate glass compositional family, suitable for use as electronic housing/enclosure, comprises, in its broadest embodiment, in mole percent as oxides on a batched basis, 40-80% $SiO_2$, 0-28% $Al_2O_3$, 0-12% $B_2O_3$, 0-18% $Li_2O$, 0-10% $Na_2O$, 0-18% $K_2O$, 0-16% MgO, 0-10% $MgF_2$, 0-8% CaO, 0-15% $CaF_2$, 0-20% SrO, 0-12% BaO, 0-8% ZnO, 0-4% $P_2O_5$, 0-2% $TiO_2$, 0-5% $ZrO_2$, 0-1% $SnO_2$, 0-1% $Sb_2O_3$, 0-1% $As_2O_3$.

In a narrower embodiment, the suitable enclosure/housing glass is an alkali aluminosilicate that is capable of being down drawn (more particularly fusion drawn) into thin glass articles which can be subsequently formed into electronic device housing/enclosures. This alkali aluminosilicate glass comprises the following oxides, the concentrations of which are expressed in mole percent (mol %): $64 \leq SiO_2 \leq 68$; $12 \leq Na_2O \leq 16$; $8 \leq Al_2O_3 \leq 12$; $0 \leq B_2O_3 \leq 3$; $2 \leq K_2O \leq 5$; $4 \leq MgO \leq 6$; and $0 \leq CaO \leq 5$. In addition, 66 mol % $\leq SiO_2 + B_2O_3 + CaO \leq 69$ mol %; $Na_2O + K_2O + B_2O_3 + MgO + CaO + SrO > 10$ mol %; 5 mol % $\leq MgO + CaO + SrO \leq 8$ mol %; $(Na_2O + B_2O_3) - Al_2O_3 \leq 2$ mol %; 2 mol % $\leq Na_2O - Al_2O_3 \leq 6$ mol %; and 4 mol % $\leq (Na_2O + K_2O) - Al_2O_3 \leq 10$ mol %. The glass has a liquidus viscosity of at least 130 kpoise which enables the glass to be down drawn.

As used herein, "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature.

Another more specific embodiment of the suitable alkali aluminosilicate that is capable of being down drawn (more particularly fusion drawn) into thin glass articles which can be subsequently formed into electronic device housing/enclosures is shown below. The alkali alumininosilicate glass specifically comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O + Na_2O + K_2O \leq 20$ mol % and 0 mol % $\leq MgO + CaO \leq 10$ mol %.

Still yet another more specific embodiment of the suitable alkali aluminosilicate that is capable of being down drawn (more particularly fusion drawn) into thin glass articles which can be subsequently formed into electronic device housing/ enclosures is shown below The alkali alumininosilicate glass specifically comprises: 61 mol % $\leq SiO_2 \leq 75$ mol %; 7 mol % $\leq Al_2O_3 \leq 15$ mol %; 0 mol % $\leq B_2O_3 \leq 12$ mol %; 9 mol % $\leq Na_2O \leq 21$ mol %; 0 mol % $\leq K_2O \leq 4$ mol %; 0 mol % $\leq MgO \leq 7$ mol %; and 0 mol % $\leq CaO \leq 3$ mol %.

One final specific embodiment of the suitable alkali aluminosilicate that is capable of being down drawn (more particularly fusion drawn) into thin glass articles which can be subsequently formed into electronic device housing/enclosures is shown below The alkali alumininosilicate glass specifically comprises 60-72 mol % $SiO_2$; 9-16 mol % $Al_2O_3$; 5-12 mol % $B_2O_3$; 8-16 mol % $Na_2O$; and 0-4 mol % $K_2O$, wherein $$\frac{Al_2O_3(\text{mol }\%) + B_2O_3(\text{mol }\%)}{\sum \text{alkali metal modifiers (mol \%)}} > 1$$

Regardless of whether the alkali aluminosilicate glass composition is capable of being down drawn into an initial sheet configuration, ultimately the glass selected for use as the housing or enclosure should additionally exhibit good formability. As such it should be capable of being easily formed in the desired housing or enclosure. Specifically, it is desirable that the glass material utilized is capable of easily being formed into the desired housing or enclosure shape through the utilization of standard processing including, but not limited to techniques such as pressing, sagging, vacuum sagging, sheet coin and combinations thereof. Obviously if the glass article to be produced is a 2 dimensional flat protective cover (or backing) that article would not necessarily require any reforming, however it is contemplated that the once the glass article is drawn into flat sheet, some lapping or polishing may be required.

In another aspect the glass article, particularly enclosure can be subject to an ion exchange process. At least one surface of the glass-ceramic article is subject to an ion exchange process, such that the one ion exchanged ("IX") surface exhibits a compressive layer having a depth of layer (DOL) greater than or equal to 20 µm exhibiting a compressive strength of at least 400 MPa. Any ion exchange process known to those in the art is suitable so long as the above DOL and compressive strength are achieved. Such a process would include, but is not limited to submerging the glass article in a bath of molten Nitrate, Sulfate, and/or Chloride salts of Lithium, Sodium, Potassium and/or Cesium, or any mixture thereof; e.g., $KNO_3$, $K_2SO_4$, KCl, $NaNO_3$. The bath and samples are held at a constant temperature above the melting temperature of the salt and below its decomposition temperature, typically between 350 and 600° C. The time required for ion-exchange of typical glasses can range between 15 minutes and 48 hours, depending upon the diffusivity of ions through the glass. In certain cases, more than one ion-exchange process may be used to generate a specific stress profile or surface compressive stress for a given glass material. A representative ion exchange would involve a 6-8 hr soak in a 410° C. molten bath of 100% KNO3 contained in a stainless steel vessel. Following ion-exchanging, the glass articles would be removed from the bath, cooled, washed in water and inspected.

One representative example from each of these three aforementioned alkali aluminosilicate glass compositional ranges are provided in Table 1:

Example 1 being representative of the broadest compositional family;

Examples 2 and 3 being representative of the first and second down drawable compositions, respectively;

Examples 4 and 5 being representative of the third listed down drawable composition; and, Examples 6 and 7 being representative of the fourth listed down drawable compositions.

Additionally, disclosed in Table 1 are the following properties of each of the representative compositions; Strain Point (Strain), Annealing Point (Anneal), Softening Point (Softening), Density (Density) and Coefficient of Thermal Expansion (CTE).

TABLE 1

| | Ex. 1 | Ex. 2 | Ex. 3 | Ex. 4 | Ex. 5 | Ex. 6 | Ex. 7 |
|---|---|---|---|---|---|---|---|
| Composition Wt % | | | | | | | |
| $SiO_2$ | 60.5 | 61.45 | 61.54 | 70.22 | 70.16 | 57.4 | 64 |
| $Al_2O_3$ | 17.0 | 16.4 | 16.24 | 8.63 | 8.86 | 19.0 | 13.5 |
| $Na_2O$ | 12.5 | 13 | 13.43 | 14.27 | 13.42 | 11.5 | 13.5 |
| $K_2O$ | 3.35 | 3.45 | 3.57 | 1.18 | 1.67 | 1.4 | |
| MgO | 3.6 | 3.53 | 3.56 | 5.09 | 5.18 | | |
| CaO | 0.5 | 0.39 | 0.5 | 0.44 | 0.44 | | |
| $B_2O_3$ | | 0.68 | 0.65 | | | 10.4 | 9.0 |
| $SnO_2$ | 0.023 | 0.014 | 0.48 | 0.20 | 0.17 | .27 | 0.1 |
| $ZrO_2$ | | 0.04 | 0.02 | 0.01 | 0.02 | | |
| $Fe_2O_3$ | 0.025 | 0.02 | 0.02 | 0.01 | 0.01 | | |
| $TiO_2$ | 0.8 | | | | | | |
| $As_2O_3$ | 1.05 | 1.01 | | | | | |
| $Sb_2O_3$ | 0.15 | | | | | | |
| Property | | | | | | | |
| Strain (° C.) | 574 | 546 | 553 | | | 526 | |
| Anneal (° C.) | 624 | 598 | 602 | | | 577 | |
| Softening (° C.) | 875 | 833 | 837 | | | 820 | |
| Density (g/cm$^3$) | 2.45 | 2.45 | 2.452 | | | 2.35 | |
| CTE (×10$^{-7}$/° C., 0-300° C.) | 88 | 90 | 91.4 | | | 75 | |

A sample of glass comprising the composition of example 3 was formed and tested for certain electrical and mechanical properties (as listed) and those properties are reported in Tables 2 and 3 respectively. In particular, the above glass was batched, melted and formed into a boule which was then core drilled to form two different dimension rods for mechanical and electrical testing: (1) 3.5 diameter mm×12 mm length rods; and, (2) 5.5 diameter×30 mm long rods. As reported in Table 2, this glass sample exhibited good radio and microwave transparency, as evidenced by a loss tangent that does not exceed 0.021 for frequencies ranging from 54 MHz to 2986 MHz. Additionally, this glass exhibited sufficient mechanical properties making it suitable for use as electronic device housing/enclosure, as evidenced by the measured fracture toughness of 0.7 MPa·m$^{1/2}$, the Young's modulus/stiffness of 73.3 GPa.

TABLE 2

| Electrical Properties Frequency | Example A Loss Tangent |
|---|---|
| Group A | |
| 54 MHz | 0.021 |
| 163 MHz | 0.014 |
| 272 MHz | 0.012 |
| 381 MHz | 0.012 |
| 490 MHz | 0.011 |
| 599 MHz | 0.012 |
| Group B | |
| 397 MHz | 0.010 |
| 912 MHz | 0.012 |
| 1499 MHz | 0.012 |
| 1977 MHz | 0.012 |
| 2466 MHz | 0.013 |
| 2986 MHz | 0.013 |

TABLE 3

| Mechanical Properties | Example A |
|---|---|
| Fracture toughness (MPa m$^{1/2}$) | 0.7 |
| Stiffness (Young's modulus, GPa) | 73.3 |
| CTE (×10$^{-7}$/° C., 0-300° C.) | 91 |
| Density (g/cm$^3$) | 2.45 |

Sample of glass comprising the composition of example 3 and Example 7, Example B and C respectively, were formed and tested for certain electrical and mechanical properties and those properties are reported in Tables 4 and 5 respectively; CS representing compressive stress, DOL representing compressive stress depth of layer, CT representing central tension, Vickers H and Vickers IT representing Vickers Hardness and Vickers Indentation Threshold, respectively. In a manner similar to Example A the glass was batched, melted and formed into a boule which was again then core drilled to form two different dimension rods for electrical testing: (1) 3.5 diameter mm×12 mm length rods; and, (2) 5.5 diameter×30 mm long rods. As before, for mechanical testing, specifically 4-point bend strength testing, 60 mm by 44 mm by 0.7 mm thick samples were produced; standard ASTM 4-point bend test protocol was utilized. As reported in Table 4, these glass samples exhibited good radio and microwave transparency, as evidenced by a loss tangent that does not exceed 0.016 and 0.018, respectively, for frequencies ranging from 54 MHz to 2986 MHz. Additionally, this glass exhibited sufficient mechanical properties making it suitable for use as electronic device housing/enclosure, as evidenced by DOL's of 60 or greater, compressive stresses and central tension exceeding 650 MPa and approximately 50, measured fracture toughnesses of 0.66 and 0.68 MPa·m$^{1/2}$, Young's modulus/stiffness of 71.07 and 61.62.GPa. It should be noted that the Vickers hardness and Vickers indentation threshold values achieved also contributed to this suitability as device enclosure material.

TABLE 4

| Electrical Properties Frequency | Example B Loss Tangent | Example C |
|---|---|---|
| Group A | | |
| 54 MHz | 0.015 | 0.013 |
| 163 MHz | 0.014 | 0.013 |
| 272 MHz | 0.013 | 0.0017 |
| 381 MHz | 0.013 | 0.014 |
| 490 MHz | 0.013 | 0.015 |
| 599 MHz | 0.012 | 0.015 |
| Group B | | |
| 397 MHz | 0.012 | 0.009 |
| 912 MHz | 0.014 | 0.015 |
| 1499 MHz | 0.014 | 0.016 |
| 1977 MHz | 0.015 | 0.017 |
| 2466 MHz | 0.015 | 0.017 |
| 2986 MHz | 0.016 | 0.018 |

TABLE 5

| Mechanical Properties | Example B | Example C |
|---|---|---|
| Fracture toughness (MPa m$^{1/2}$) | 0.68 | 0.66 |
| Stiffness (Young's modulus, GPa) | 71.07 | 61.62 |
| CTE (×10$^{-7}$/° C., 0-300° C.) | 85 | 75 |
| Density (g/cm$^3$) | 2.439 | 2.346 |
| CS (MPa) | 676 | 691 |
| DOL (μm) | 60 | 65 |
| CT (MPa) | 49 | 74 |
| Vickers H (kgf/mm$^2$) | 550 | 490 |
| Vickers IT (kgf) | 650 | 680 |
| 4-Point Bend Strength (MPa) | 6 to 7 | >30 |

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. An article suitable for housing, enclosing or covering the components of a portable electronic device, the article comprising an ion exchanged alkali-aluminosilicate glass consisting essentially of 64 mol %≦SiO$_2$≦68 mol %; 12 mol %≦Na$_2$O≦16 mol %; 8 mol %≦Al$_2$O$_3$≦12 mol %; 0 mol % ≦ B$_2$O$_3$≦3 mol %; 2 mol %≦K$_2$O≦5 mol %; 4 mol %≦MgO≦6 mol %; and 0 mol %≦CaO≦5 mol %, wherein: 66 mol %≦SiO$_2$+B$_2$O$_3$ +CaO≦69 mol %; Na$_2$O+K$_2$O+B$_2$O$_3$+MgO+CaO+SrO>10 mol %; 5 mol %≦MgO+CaO+SrO≦8 mol %; 2 mol %≦Na$_2$O−Al$_2$O$_3$≦6 mol %; and 4 mol %≦(Na$_2$O+K$_2$O)−Al$_2$O$_3$≦10 mol %, and exhibiting radio and microwave frequency transparency, as defined by a loss tangent of less than 0.03 and at a frequency range of between 15 MHz to 3.0 GHz, infrared transparency, a fracture toughness of greater than 0.60 Mpa·m$^{1/2}$, a 4-point bend strength of greater than 350 MPa, a Vickers hardness of at least 450 kgf/mm$^2$, a Vickers median/radial crack initiation threshold of at least 5 kgf, a Young's Modulus ranging between 50 to 100 GPa, a thermal conductivity of less than 2.0 W/m° C. and at least one of the following attributes:

(i) a compressive surface layer having a depth of layer (DOL) greater than or equal to 20 μm and a compressive stress greater than 400 MPa, or, (ii) a central tension of more than 20 MPa.

2. The article claimed in claim 1 wherein the glass exhibits a refractive index of greater then 1.47 at 633 nm.

3. The article claimed in claim 1 wherein the glass exhibits radio and microwave frequency transparency, as defined by a loss tangent of less than 0.015 at a frequency range of between 500 MHz to 3.0 GHz.

4. The article claimed in claim 1 wherein the glass exhibits a fracture toughness of greater than 0.75 Mpa·m$^{1/2}$.

5. The article claimed in claim 1 wherein the glass exhibits a Young's Modulus ranging between 50 and 75 GPa.

6. The article claimed in claim 1 wherein the glass exhibits an 4-point bend strength of greater than 475 MPa.

7. The article claimed in claim 1 wherein the glass exhibits a Vickers hardness of at least 500 kgf/mm$^2$ and Vickers median/radial crack initiation threshold of greater than 10 kgf.

8. The article claimed in claim 1 wherein the glass exhibits a thermal conductivity of less than 1.5 W/m° C.

9. The article claimed in claim 1 wherein the glass article is transparent and exhibits at least one surface having a Ra roughness of less than less than 50 nm.

10. The article claimed in claim 1 wherein the glass article appears opaque and exhibits at least one surface having a Ra roughness of between 50 nm and 15 μm.

11. The article as claimed in claim 1 wherein the glass exhibits a near-infra-red transparency of greater than 80% at a wavelength ranging from 750 to 2000 nm.

12. The article as claimed in claim 1 wherein the article exhibits an overall thickness of 1.2 mm and compressive layer exhibiting a DOL of ranging between 40 to 80 μm and the compressive layer exhibits a compressive stress of 525 MPa.

13. The article as claimed in claim 1 wherein the glass exhibits a liquidus viscosity of greater than 130,000 poise at temperatures below 1275° C.

14. The article as claimed in claim 1 wherein the glass is fusion formable and the article is formed by standard processing techniques selected from the group consisting of pressing, sagging, vacuum sagging, sheet coin and combinations thereof.

* * * * *